Figure 3:
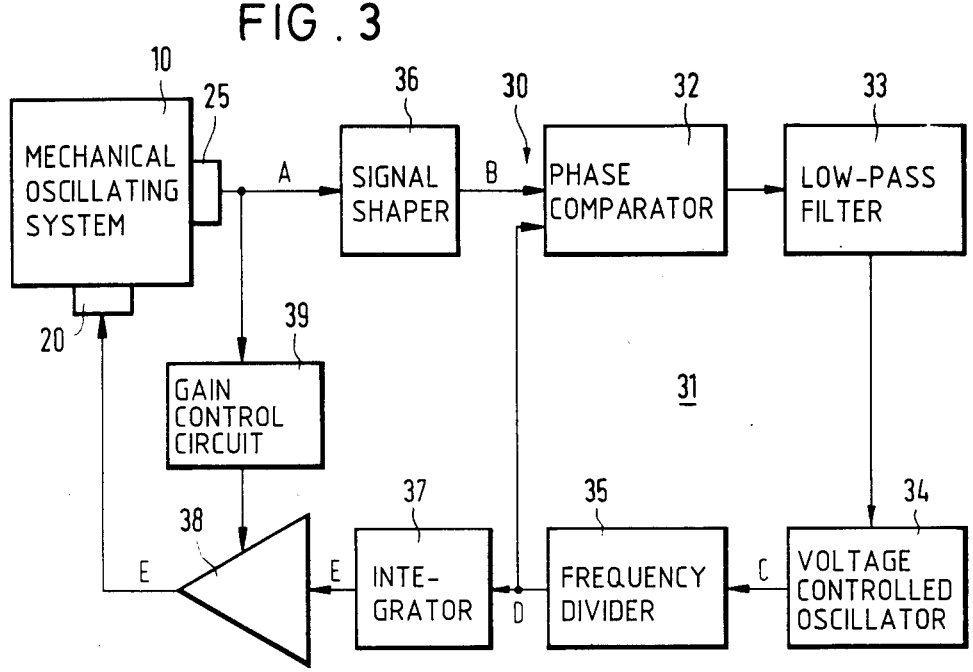

United States Patent [19]

Flecken

[11] Patent Number: 4,801,897
[45] Date of Patent: Jan. 31, 1989

[54] ARRANGEMENT FOR GENERATING NATURAL RESONANT OSCILLATIONS OF A MECHANICAL OSCILLATING SYSTEM

[75] Inventor: Peter Flecken, Weil-Haltingen, Fed. Rep. of Germany

[73] Assignee: Flowtec AG, Switzerland

[21] Appl. No.: 100,405

[22] Filed: Sep. 24, 1987

[30] Foreign Application Priority Data

Sep. 26, 1986 [DE] Fed. Rep. of Germany ....... 3632801
Sep. 11, 1987 [DE] Fed. Rep. of Germany ... 8712331[U]

[51] Int. Cl.⁴ .................. G01N 27/00; G01F 1/84
[52] U.S. Cl. .................................. 331/65; 331/155; 73/861.38
[58] Field of Search .............. 331/18, 25, 65, 154, 331/155; 250/227, 231 R; 356/373; 73/861.38

[56] References Cited

U.S. PATENT DOCUMENTS

| | | | |
|---|---|---|---|
| Re. 31,450 | 11/1983 | Smith | 73/861.38 |
| 3,826,993 | 7/1974 | White | 331/154 X |
| 4,127,028 | 11/1978 | Cox et al. | 73/861.38 |
| 4,192,184 | 3/1980 | Cox et al. | 73/861.38 |
| 4,252,028 | 2/1981 | Smith et al. | 73/861.38 |
| 4,271,371 | 6/1981 | Furuichi et al. | 331/154 X |
| 4,302,728 | 11/1981 | Nakamura | 331/154 X |
| 4,311,054 | 1/1982 | Cox et al. | 73/861.38 |
| 4,345,482 | 8/1982 | Adolfsson et al. | 331/155 |
| 4,420,983 | 12/1983 | Langdon | 73/861.18 |
| 4,637,307 | 1/1987 | Miller | 101/93.04 |
| 4,642,581 | 2/1987 | Erickson | 331/154 |
| 4,680,974 | 7/1987 | Simonsen et al. | 73/861.38 |

FOREIGN PATENT DOCUMENTS

2621086 3/1977 Fed. Rep. of Germany.
2703405 8/1978 Fed. Rep. of Germany.
3433499 3/1985 Fed. Rep. of Germany.

*Primary Examiner*—Eugene R. Laroche
*Assistant Examiner*—David Mis
*Attorney, Agent, or Firm*—Barnes & Thornburg

[57] ABSTRACT

An arrangement for generating natural resonant oscillations of a mechanical oscillating system includes an electromechanical oscillation exciter which on excitation by an electrical excitation signal generates a drive force setting the oscillating system in mechanical oscillations, an oscillation sensor which is formed as displacement sensor and senses the mechanical oscillations of the oscillating system and converts them to an electrical sensor signal, and an excitation circuit which receives the sensor signal and supplies to the oscillation exciter the electrical excitation signal with the frequency of the sensor signal. The excitation circuit includes a phase control circuit which controls the phase position of the excitation signal in dependence upon the phase position of the sensor signal. A phase shift circuit produces a phase displacement of 90° between the sensor signal and the excitation signal so that the phase condition for the excitation of the mechanical oscillations at the natural resonant frequency of the mechanical oscillating system is fulfilled. This makes it possible to maintain the natural resonant frequency of the mechanical oscillating system with very great accuracy and high stability with time even with oscillating systems of high quality.

6 Claims, 3 Drawing Sheets

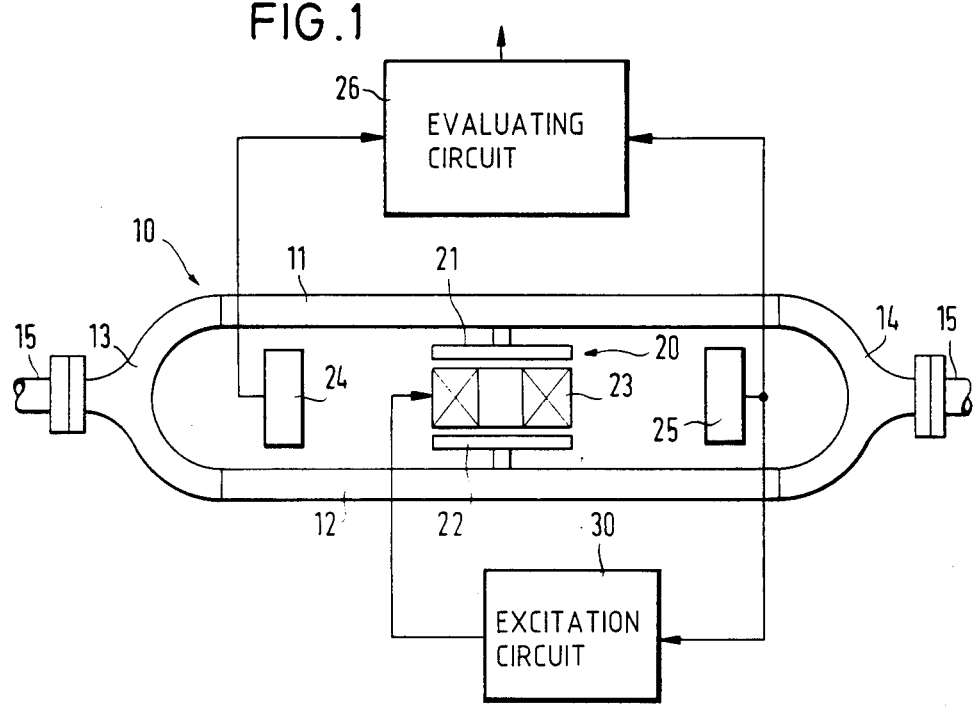
FIG.1
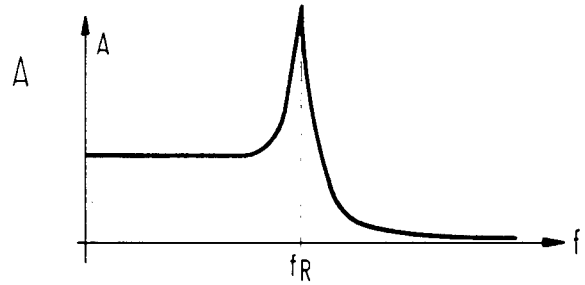
FIG.2
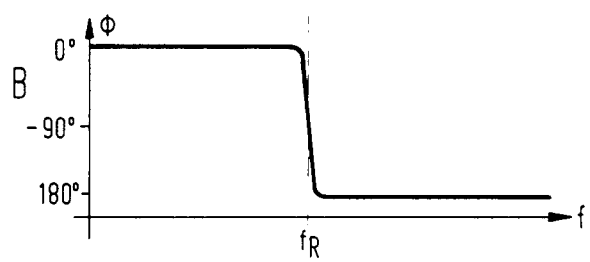

ARRANGEMENT FOR GENERATING NATURAL RESONANT OSCILLATIONS OF A MECHANICAL OSCILLATING SYSTEM

The invention relates to an arrangement for generating natural resonant oscillations of a mechanical oscillating system comprising an electromechanical oscillation exciter which on excitation by an electrical excitation signal generates a drive force which sets the oscillating system in mechanical oscillations and the phase position of which coincides with the phase position of the excitation signal, an oscillation sensor converting the mechanical oscillations to an electrical sensor signal and an excitation circuit which receives the sensor signal and emits the excitation signal and which includes a phase control circuit having a phase comparator and an oscillator circuit frequency-controllable and phase-controllable by the output signal of the phase comparator, the phase comparator receiving at the first input a signal in defined phase relationship to the sensor signal and at the second input the output signal of the oscillator circuit and the phase control circuit compelling a phase-rigid synchronization between the two input signals of the phase comparator, the excitation signal being derived from the output signal of the oscillator circuit. German patent application as laid open to inspection No. 3,433,499 discloses in a method for electrical driving of a pendulum printing mechanism maintaining the resonance state of the mechanical oscillating system by causing the drive force by means of a phase control circuit to follow up the deflection velocity of the oscillating system in frequency and phase. This is easily possible because the phase condition is fulfilled if the drive force is in phase with the deflection velocity However, the magnetic-inductive oscillation sensors used for detecting the velocity have a considerable inherent weight due to their permanent magnets and induction coils and require complicated securing means and cable means on the oscillating system. This all increases the inertia, although that is not a disadvantage in a pendulum pressure mechanism.

There are however uses, for example highly sensitive measuring devices, in which it is essential to set a mechanical oscillating system of high quality with very narrow-band resonance curve in natural resonant oscillations very accurately and stable in time and these oscillations should be influenced as little as possible by the oscillation sensors used for oscillation sensing. This is in particular the case with Coriolis force mass flow meters whose mechanical oscillating system consists of one or more measuring tubes through which the measured medium flows The measuring tubes are set in oscillations transversely of the flow direction and the phase displacements caused by the Coriolis force between the mechanical oscillations at the two ends of each measuring tube are determined as a measure of the mass flow. Since these phase displacements are very small the measuring accuracy can be impaired by using oscillation sensors of large mass or oscillation sensors which in turn generate reaction forces.

The problem underlying the invention is the provision of an arrangement of the type set forth at the beginning in which the mechanical oscillating system is stimulated to natural resonant oscillations very exactly whilst maintaining the resonance conditions without the oscillation properties of the oscillating system being impaired.

According to the invention this problem is solved in that the oscillation sensor is a displacement sensor so that the phase position of the sensor signal coincides with the phase position of the deflection of the mechanical oscillating system and that the excitation circuit includes a phase shift circuit which produces a phase shift of 90° between the sensor signal received at the input of the excitation circuit and the excitation signal emitted at the output of the excitation circuit.

Thus, according to the invention the deflection of the oscillating system is detected directly by a displacement sensor which of course can be constructed so that its influence on the oscillation dynamics is negligible. In particular, optical displacement sensors are suitable for this purpose. However, the displacement signal furnished by a displacement sensor has a phase shift of 90° with respect to the drive force but the phase shift circuit additionally provided according to the invention establishes the phase position necessary for fulfilling the resonance condition. It is possible in this manner even when using a displacement sensor to maintain the oscillating mechanical system at its natural resonant frequency with great accuracy and stability by means of a phase control circuit. Consequently, in mechanical oscillating systems of high quality as well the oscillations can be generated with low excitation power. This makes it possible in particular to use the oscillating system in areas in which there is a danger of explosion.

Figure 4:
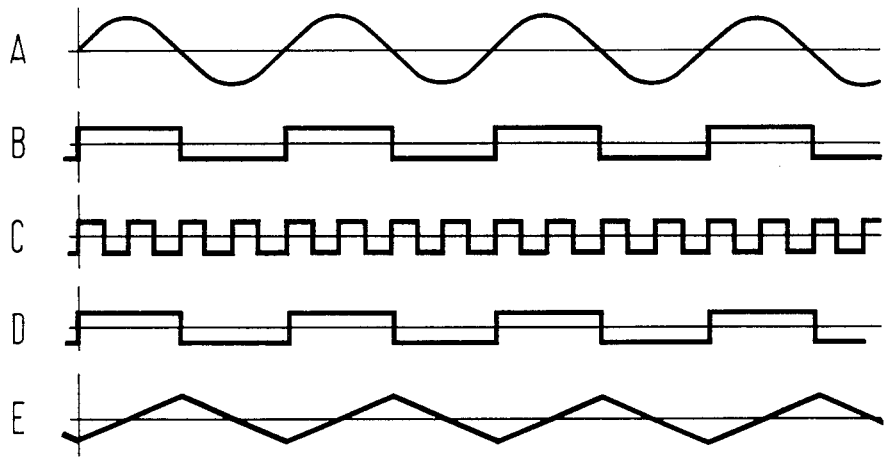
Figure 5:
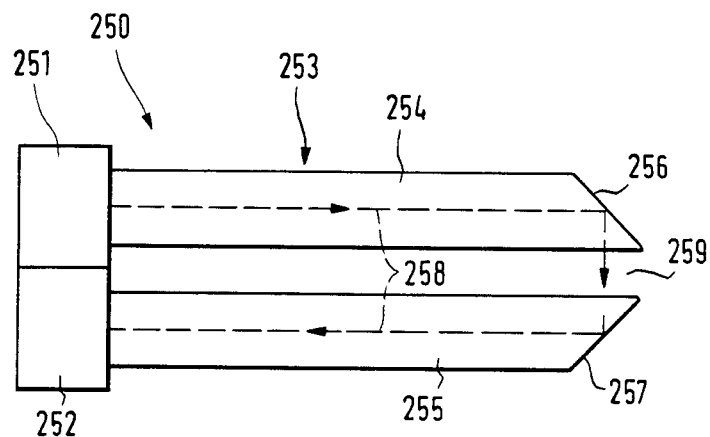
Figure 6:
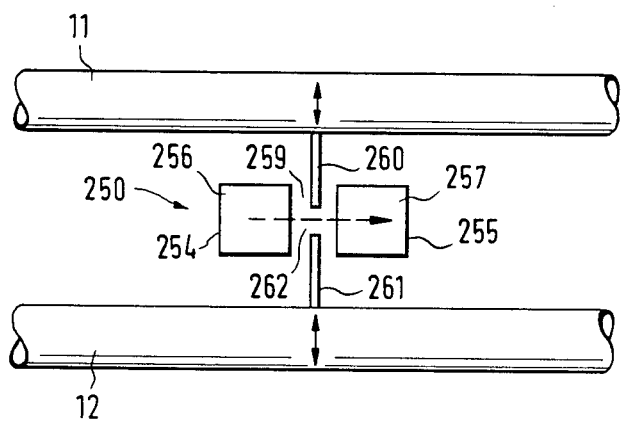

Advantageous embodiments and further developments of the invention will be apparent from the subsidiary claims and from the following description of an example of embodiment which is illustrated in the drawings, wherein:

FIG. 1 is a schematic illustration of a Coriolis force mass flow meter as example of a mechanical oscillating system vibrating in natural resonance in which the invention can be used, FIG. 2 illustrates the amplitude and phase characteristics of a mechanical oscillating system of high quality, FIG. 3 shows the block circuit diagram of the excitation circuit of FIG. 1 in an embodiment of the invention, FIG. 4 shows the time profile of various signals occurring in the excitation circuit of FIG. 3, FIG. 5 is a schematic illustration of an optical displacement sensor and FIG. 6 shows the incorporation of the optical displacement sensor of FIG. 5 into the Coriolis force mass flow meter of FIG. 1.

FIG. 1 shows as example of a mechanical oscillating system vibrating in natural resonance a Coriolis force mass flow meter 10 having two parallel straight measuring tubes 11 and 12. The measuring tubes are inserted at both ends by distributing pieces 13, 14 into a pipe 15 through which the measured medium whose mass flow is to be measured flows. Thus, the two measuring tubes 11, 12 are traversed in parallel by the measured medium.

Arranged in the centre of the two measuring tubes 11 and 12 is an oscillation exciter 20 which can set the two measuring tubes 11, 12 in opposite flexural oscillations whose oscillation plane lies in the common plane of the two measuring tubes, i.e. in the plane of the drawing of FIG. 1. The oscillation exciter may be any desired electromechanical transducer which when supplied with an electrical excitation signal generates a drive force acting on the measuring tubes. Depending on the nature of the electromechanical transducer the excitation signal may be an electrical AC voltage or an electrical alternating current. In the example illustrated it is assumed that the transducer is an electromagnetic transducer. Secured to the two measuring tubes 11, 12 in their centre are permanent magnets 21, 22 and between said permanent magnets 21, 22 there is a stationary magnetic coil 23. The permanent magnets 21, 22 are so poled that they are simultaneously attracted or repelled when a current is sent through the magnet coil 23 in the one or other direction. Thus, if an electrical alternating current is sent through the magnetic coil 23 the measuring tubes 11, 12 are set into oppositely directed flexural oscillations with the frequency of the alternating current. The drive force setting the mechanical oscillating system in oscillation is formed in this case by the attraction and repulsion forces between the permanent magnets 21, 22 and the magnet coil 23.

The measurement of the mass flow in such a mass flow meter is based on the fact that the measured medium flowing through the oscillating measuring tubes generates Coriolis forces which result in a mutual phase shift of the mechanical oscillations at the two ends of each measuring tube. The magnitude of said phase shift is a measure of the mass flow. To measure the phase shift at both sides of the oscillating exciter 20 at equal distances therefrom oscillation sensors 24, 25 are arranged. The oscillation sensors furnish electrical sensor signals which are characteristic of the phase position of the oscillations sensed by them. Said sensor signals are supplied to an evaluating circuit 26 which determines therefrom the mass flow.

To ensure that an adequate oscillation amplitude of the measuring tubes 11, 12 is achieved with the minimum possible drive power the oscillation excitation is effected as closely as possible to the natural resonance frequency of the mechanical oscillating system formed by the measuring tubes 11, 12. For this purpose the output signal of the oscillation sensor 25 is supplied to an excitation circuit 30 which sends to the oscillation exciter 20 an electrical excitation signal which has the same frequency as the sensor signal and the amplitude of which suffices to maintain the mechanical oscillations. The oscillation exciter driven by the excitation circuit 30 stimulates the measuring tubes 11, 12 to mechanical flexural oscillations with the natural resonance frequency of the oscillating system formed by them. In the example of embodiment illustrated, in which the oscillation exciter is an electromechanical transducer, the excitation signal is an alternating current. In other types of oscillation energizers the excitation signal may also be an AC voltage.

To help understand the resonance conditions diagrams A and B of FIG. 2 show the amplitude and phase characteristics of an oscillating system of high quality as represented by the Coriolis force mass flow meter shown in FIG. 1 and having oppositely oscillating straight parallel measuring tubes. Diagram A shows the amplitude of the mechanical oscillations as a function of the excitation frequency f at constant amplitude of the excitation alternating current. At frequencies beneath the natural resonant frequency $f_R$ the amplitude is almost constant and relatively small. Not until frequencies lying only slightly below the natural resonant frequency $f_R$ does the amplitude become greater and on approximation to the natural resonance frequency $f_R$ it rises very steeply. The amplitude curve has a sharp maximum at the natural resonant frequency $f_R$ and at higher frequencies again drops very rapidly to a relatively small value.

Diagram B of FIG. 2 shows the corresponding characteristic of the phase shift $\phi$ of the oscillation movement of the mechanical oscillating system plotted against the phase position of the drive force which in the case of the electromagnetic oscillating exciter of FIG. 1 coincides with the phase position of the excitation alternating current. At frequencies far below the natural resonant frequency $f_R$ the mechanical oscillating system follows the drive force practically without delay; between the drive force and the oscillating movement there is a phase displacement $\phi = 0°$. It is not until frequencies lying only slightly beneath the natural resonant frequency $f_R$ that the oscillating movement begins to trail the exciting force and at the natural resonant frequency $f_R$ the phase displacement $\phi = -90°$, the minus sign denoting the phase lag of the oscillating movement. On further increasing the excitation frequency the phase lag further rises rapidly and at a frequency lying only slightly above the natural resonant frequency $f_R$ reaches the value $\phi = -180°$ which it retains at still higher excitation frequencies.

It is apparent from diagram A of FIG. 2 that with a mechanical oscillating system of high quality even a relatively small deviation from the natural resonant frequency $f_R$ results in the oscillation amplitude becoming considerably smaller. To generate an adequate oscillation amplitude as necessary for example for mass flow measurement by the Coriolis principle the excitation alternating current must then be correspondingly increased. This means a larger power expenditure which is undesirable in many case, in particular when using the measuring devices in regions where there is a danger of explosion because in such regions maximum admissible values for electrical currents and voltages are prescribed and these must not be exceeded.

FIG. 3 shows a configuration of the excitation circuit 30 which gives a self-excitation of the mechanical oscillations with a frequency which corresponds with great accuracy to the natural resonant frequency of the mechanical oscillating system. In FIG. 3 the mechanical oscillating system 10 with the oscillation exciter 20 and the oscillation sensor 25 is represented in simplified form by a block.

The excitation circuit 30 includes as essential component a phase control circuit 31 comprising a phase comparator 32, a low-pass filter 33, a voltage-controlled oscillator 34 and a frequency divider 35. The sensor signal furnished by the oscillation sensor 25 is supplied to the one input of the phase comparator 32 via signal shaper 36. The phase comparator 32 receives at the other input the output signal of the frequency divider 35 and emits at the output a voltage which depends on the phase difference between its input signals. After smoothing in the low-pass filter 33 this voltage is applied to the control input of the voltage-controlled oscillator 34. As is known, a voltage controlled oscillator, also referred to as "VCO", generates at the output an electrical alternating signal whose frequency depends on the voltage applied to the control input. The frequency of the output signal of the voltage controlled oscillator 34 is a multiple of the frequency of the sensor signal and in the frequency divider 35 is reduced to the frequency of the sensor signal. Such a phase control circuit, also known by the name "PLL" (phase-locked loop), maintains a phase-rigid relationship between the two signals applied to the input of the phase comparator 32.

The output signal of the frequency divider 35 is also applied to an integrator 37 whose output signal is supplied to an amplifier 38. Connected to the output of the amplifier 38 is the oscillation exciter 20. The amplifier 38 is made with controllable gain. A gain control circuit 39 receiving the sensor signal supplies a gain control voltage to the gain control input of the amplifier 38.

The diagrams A to E of FIG. 4 show the time profile of the signals occurring at the circuit points of FIG. 3 denoted by the same letters. The function of the excitation circuit of FIG. 3 can be explained with the aid of these diagrams.

Diagram A shows the sensor signal supplied by the oscillation sensor 25. This signal is a sinusoidal voltage which coincides in frequency and phase position with the movement of the mechanical oscillating system, i.e. with the deflection of the measuring tubes 11 and 12. This is thus a "displacement signal".

The sensor signal A is reshaped in the signal shaper 36 to a symmetrical rectangular signal B which is equiphase with the sensor signal A.

Diagram C shows the output signal of the voltage controlled oscillator 34. It is assumed that the voltage controlled oscillator 34 is a rectangular signal generator. The signal C is therefore a rectangular voltage whose frequency is an integer multiple of the frequency of the rectangular signal B.

The frequency divider 35 furnishes at the output a rectangular signal D which has the same frequency as the rectangular signal B and due to the phase-rigid synchronization effected by the phase control circuit 31 has exactly the same phase position as the rectangular signal B. The rectangular signal D is therefore also equiphase with the sensor signal A.

Due to the continuous integration of the rectangular signal D in the integrator 37 a triangular voltage E is formed which has the same frequency as the rectangular signal D. The extreme values of the triangular signal E lie however at the zero passages of the rectangular signal D. Due to the integration the triangular voltage E thus has a phase displacement of 90° with respect to the rectangular voltage D.

The alternating current supplied by the amplifier 38 to the oscillation exciter 20 corresponds in curve form, frequency and phase position exactly to the triangular voltage E. The magnetic coil 23 of the oscillation exciter 20 is therefore excited by an alternating current which has a phase displacement of 90° with respect to the sensor signal A furnished by the oscillation sensor 25. Since firstly the drive force generated by the magnetic coil 23 is equiphase with the excitation alternating current and secondly the sensor signal is equiphase with the deflection of the measuring tubes 11, 12 sensed by the oscillation sensor 25, the phase condition for natural resonance is exactly fulfilled as is apparent from diagram B of FIG. 2: the drive force has a phase shift of 90° with respect to the deflection of the mechanical oscillation.

The integrator 37 fulfils two functions: firstly it forms from the rectangular signal D a triangular signal whose curve form is more favourable for the excitation of the magnetic coil 23; secondly, it acts as phase shifter which introduces a fixed phase shift of 90° between the sensor signal A and the output signal of the phase control circuit 31. In conjunction with the phase-rigid synchronization by the phase control circuit in this manner the necessary phase relationship required to fulfil the phase condition is obtained between the sensor signal A and the excitation signal E.

Instead of placing the 90° phase shifter after the output of the frequency divider 35 to impart to the excitation signal E a phase displacement of 90° with respect to the frequency divider output signal D, it would alternatively be possible to locate said shifter between the displacement sensor 25 and the phase comparator 32 so that the signal B supplied to the phase control circuit 31 is given a phase displacement of 90° with respect to the displacement signal A. Of course, in this case the excitation signal E would have to be in phase with the frequency divider output signal D. The formation of the 90° phase shifter illustrated in FIG. 3 as the integrator 37 following the phase control circuit 31 has however the advantage that the two functions of phase shifting and signal shaping are combined in the integrator 37.

By the gain control circuit 39 the amplitude of the excitation alternating current supplied to the oscillation exciter 20 is regulated to maintain a predetermined constant amplitude of the sensor signal A and thus also a predetermined constant oscillation amplitude of the mechanical oscillations.

It is also possible to use instead of the permanent magnets 21, 22 of FIG. 1 a soft-iron armature. However, the triangular current cannot then be zero symmetrical as in diagram E of FIG. 4 because the soft-iron armature would then be attracted both in the positive and in the negative half periods and this would result in an oscillation excitation with twice the frequency. If however the triangular current changes in only one direction from the zero line the excitation of the mechanical oscillations is again with the frequency of the triangular current.

The following is also to be pointed out regarding the particular use as Coriolis force mass flow meter described as example: as mentioned, the mass flow causes a phase displacement of the mechanical oscillations between the location of the oscillation exciter 20 and the points at which the oscillation sensors 24 and 25 are disposed. Since as sensor signal for the excitation circuit 30 the output signal of the oscillation sensor 25 is used, said sensor signal has an additional phase shift depending on the mass flow. This phase shift is however extremely small so that it can be disregarded in the fulfilling of the phase condition. However, if it is desired to eliminate even this small phase shift it is readily possible to arrange an additional oscillation sensor directly at the location of the oscillation exciter 20 and to supply the sensor signal generated by said oscillation sensor to the excitation circuit 30.

A preferred embodiment of an oscillation sensor 250 constructed as displacement sensor consists according to FIG. 5 essentially of a light transmitter 251, a light receiver 252 and light waveguide means 253 which transmit the light of the light transmitter 251 to the light receiver 252 in such a manner that the transmitted light flux can be influenced by the oscillations of the measuring tubes 11, 12.

As light transmitter 251 a light-emitting diode may be used. The light receiver 252 is a photoelectric transducer which converts the light received to an electrical signal representing the sensor signal For example, for this purpose a PIN diode may be used in the infrared range (e.g. at a wavelength of 880 nm). The light waveguide means 253 is formed by two sapphire rods arranged parallel at a slight distance apart which at the one end are connected to the light transmitter 251 and the light receiver 252 respectively whilst the free other ends are bevelled at an angle of 45° so that the inclined end faces 256 and 257 thus formed are at a right-angle to each other. The beam path obtained by this configuration for the light flux emitted by the light transmitter 251 is illustrated in FIG. 5 by the dashed line 258. In the sapphire rod 254 the light is propagated axially until it meets the inclined end face 256 where it is totally reflected at an angle of 90°. It passes through the air gap 259 present between the two sapphire rods 253 and 254 and is incident on the inclined end face 257 of the sapphire rod 255 where it is again totally reflected at an angle of 90° so that it is propagated axially in the sapphire rod 255 and impinges on the light receiver 252. The two inclined end faces 256 and 257 thus together deflect the light in the manner of a right-angled prism through 180°.

According to FIG. 6 the arrangement of FIG. 5 is incorporated into the Coriolis force mass flow meter of FIG. 1 to form a displacement sensor in such a manner that the sapphire rods 254, 255 extend perpendicularly to the longitudinal axes of the measuring tubes 11, 12 and their inclined end faces 256, 257 lie between the measuring tubes. An immersion tab 260 and 261 respectively is secured to each measuring tube perpendicularly to the axis thereof in such a manner that said tab projects into the air gap 259 between the sapphire rods 254 and 255. The two immersion tabs 260, 261 lie in a plane and their facing edges are spaced apart so that a gap 262 is formed through which part of the light flux reflected at the end face 256 can pass from the sapphire rod 254 to the sapphire rod 255. If the two measuring tubes 11, 12 oscillate in opposite phase the gap 262 between the immersion tabs 260 and 261 becomes alternately wider and narrower in time with the oscillations and as a result the light flux passing from the sapphire rod 254 to the sapphire rod 255 is modulated. The amplitudes of the modulated light flux and consequently also the amplitudes of the sensor signal emitted by the light receiver 252 correspond to the oscillation amplitudes of the measuring tubes 11, 12.

The gain control circuit 39 of FIG. 3 serves among other things to limit the oscillation amplitudes of the measuring tubes 11 and 12 in such a manner that collision of the two immersion tabs 260 and 261 is prevented, thereby increasing operational reliability.

I claim:

1. Arrangement for generating natural resonant oscillations of a mechanical oscillating system comprising an electro-mechanical oscillation exciter, which on excitation by an electrical excitation signal generates a drive force which sets the oscillating system in mechanical oscillations, the phase position of which coincides with the phase position of the excitation signal, a displacement sensor converting the mechanical oscillations into an electrical sensor signal having a phase position which coincides with the phase position of the deflection of the mechanical oscillating system, and an excitation circuit which receives the sensor signal and emits the excitation signal, said displacement sensor comprising a light transmitter, a light receiver and a light waveguide means, and wherein the light waveguide means comprises first and second sapphire rods of which the first sapphire rod is connected at one end to the light transmitter and the second sapphire rod is connected at one end to the light receiver, the other ends of the two sapphire rods terminating in angled faces which act as totally reflecting prisms, the angled faces lying spaced apart opposite each other in such a manner that light flux passing from the light transmitter through the first sapphire rod enters the second sapphire rod and is conducted by the second sapphire rod to the light receiver, said displacement sensor further comprising at least one immersion tab which is attached to the mechanical oscillating system in such a manner that in dependence upon the deflection of the oscillating system said tab projects to a greater or lesser extent into a gap formed between the prism-like ends of the sapphire rods.

2. Arrangement according to claim 1 in which the mechanical oscillating system is the oscillating system of a Coriolis force mass flow meter which is formed by at least one straight measuring tube in the center of which the electro-magnetic oscillation exciter is arranged in such a manner that the at least one measuring tube is set into flexural oscillations by the drive force, the Coriolis force mass flow meter comprising two oscillation sensors arranged on either side of the oscillation exciter at the same distance therefrom and converting the mechanical oscillations of the at least one measuring tube into electrical signals and an evaluating circuit connected to the oscillation sensors for generating a measuring signal corresponding to the mass flow from the phase difference of the output signals of the oscillation sensors, said tab of said displacement sensor being attached to said at least one measuring tube.

3. Arrangement according to claim 2 in which each of said oscillation sensors comprises a light transmitter, a light receiver, a light waveguide means comprising two sapphire rods and at least one tab attached to a measuring tube and projecting into the gap formed between the prism-like ends of the sapphire rods.

4. Arrangement according to claim 3 in which the displacement sensor is formed by one of the two oscillation sensors of the Coriolis force mass flow meter.

5. Arrangement according to claim 3 in which the displacement sensor is mounted directly at the location of the oscillation exciter between the two oscillation sensors.

6. Arrangement according to claim 2 in which the Coriolis force mass flow meter comprises two parallel straight measuring tubes which are set in opposite flexural oscillations by the oscillation exciter, and in which the displacement sensor comprises two tabs with each tab attached to one of said tubes so that the two tabs lie in a common plane and project into the gap formed between the ends of the sapphire rods with their facing edges being spaced apart.

* * * * *